United States Patent [19]

Kolb

[11] 4,197,116
[45] Apr. 8, 1980

[54] METHOD AND APPARATUS FOR AUTOMATICALLY CONTROLLING THE RATE OF FLUX INJECTION TO A CONVERTER

[75] Inventor: William A. Kolb, Forest Hills, Pa.

[73] Assignee: United States Steel Corporation, Pittsburgh, Pa.

[21] Appl. No.: 959,022

[22] Filed: Nov. 8, 1978

Related U.S. Application Data

[60] Division of Ser. No. 566,588, Apr. 8, 1975, Pat. No. 4,136,857, which is a continuation-in-part of Ser. No. 346,555, Mar. 30, 1973, abandoned.

[51] Int. Cl.² .............................................. C21C 5/30
[52] U.S. Cl. ........................................... 75/52; 75/60
[58] Field of Search .............................. 75/59, 60, 52

[56] References Cited
U.S. PATENT DOCUMENTS 3,871,633   3/1975   Kolb ......................................... 75/52

*Primary Examiner*—P. D. Rosenberg

*Attorney, Agent, or Firm*—David S. Urey

[57] ABSTRACT

Flux is injected into the oxygen stream being fed to the tuyeres of a steel-refining converter, such as a Q-BOP converter or the like, and the rate of injection is controlled by varying the size of the outlet orifice of the flux-containing tank. The tank is pressurized to the same pressure as the oxygen stream into which the flux is being injected. The weight of flux in the tank is continuously measured and the actual weight is compared with a preset reference weight for each point in time. The difference between the two weights is used to drive a motor in either the forward or reverse direction to open or close the variable-orifice flux tank outlet valve an amount sufficient to adjust the actual injection rate to match the reference weight for a given time.

The current weight of flux remaining in the tank is compared with an initial weight; when the difference between the two exceeds a preset total, a signal is generated which causes the motor to close the variable orifice valve. At the same time, a fluid by-pass valve is opened to by-pass the injection apparatus.

4 Claims, 13 Drawing Figures

METHOD AND APPARATUS FOR AUTOMATICALLY CONTROLLING THE RATE OF FLUX INJECTION TO A CONVERTER

CROSS REFERENCE

This is a division of application Ser. No. 566,588, filed Apr. 8, 1975, now U.S. Pat. No. 4,136,857, granted Jan. 30, 1979, which application was a continuation-in-part of application Ser. No. 346,555, filed On Mar. 30, 1973, now abandoned.

BACKGROUND OF THE INVENTION

This invention relates to steelmaking and more particularly to a method and apparatus for controlling the rate and amount of injection of flux into a steelmaking vessel as needed. Still more particularly, the invention relates to a method and apparatus for controlling the injection of flux into a steelmaking furnace, such as a Q-BOP furnace or the like. The basic Q-BOP furnace and process itself are disclosed in U.S. Pat. No. 3,706,549 issued Dec. 19, 1972 to H. Knuppel et al for "Method for Refining Pig-Iron Into Steel".

In a conventional Basic Oxygen Process for refining steel, oxygen is blown into a vessel through a lance positioned above the iron melt. While this process is satisfactory for many purposes, the mixing of the bath is not complete enough for some applications, iron losses are relatively high and only a portion of the oxygen issuing from the lance is utilized. An improved process for refining steel employs oxygen blown from below the surface of the melt resulting in better mixing, higher efficiency and less smoke generation than the conventional method. An improved process of this type is described in detail in co-pending U.S. patent application Ser. No. 312,173, William A. Kolb et al, filed Dec. 4, 1972 and assigned to United States Steel Corporation.

A converter employed in carrying out this improved method comprise a tiltable vessel having a refractory lining and a bottom plug member provided with a plurality of nozzles, or tuyeres, extending through the bottom plug member. Each tuyere consists of a center jet through which oxygen flows during the refining portion of the process and an annulus jet concentrically surrounding the center jet through which a fuel gas flows to provide cooling for the tuyere to maintain the erosion of the tuyere substantially equivalent to that of the adjacent plug refractory.

Although oxygen is used in the center jet during the refining operation, various combinations of gases are required for purging or cooling the tuyeres and during other parts of the process, such as charging the converter, sampling the resulting melt, tapping the converter after the iron has been refined and during the transition periods when the converter is being rotated to a position in which the next operation can take place. With the converter on its side during the charging, sampling and tapping operations, the tuyeres may be protected from melting by the introduction of gases, such as compressed air at the center jets and low pressure nitrogen at the annulus jets. When the vessel is being raised to its upright position for the refining operation, the pressure at the jets must be increased to assure that the molten metal will not enter the tuyeres, thereby blocking the openings and allowing them to come into contact with the steel and highly corrosive slag. Nitrogen, at a relatively high pressure, may be substituted for the compressed air during this portion of the cycle.

After the converter is in its upright position and located under a hood which carries the gases away, the refining operation is carried out by substituting oxygen for the nitrogen at the center jet and a fuel for the nitrogen at the annulus jet. The pressure during refining must be high enough to prevent the nozzles from becoming blocked or damaged by contact with the melt. During the Q-BOP refining operation, various types of fluxes, such as line, etc., are injected into the oxygen flow being fed to the center jet of the tuyeres. These fluxes are, of course, basic to the steelmaking process and are employed in required amounts to give the finished steel its desired characteristics of strength, durability, malleability, etc. In order that the finished steel will have the proper characteristics, it is necessary to accurately inject appropriate amounts of flux into the molten metal in the converter. To do this in the Q-BOP process requires a control system which will allow accurate control of the flux being fed into the oxygen flow for injection into the molten metal bath through the tuyeres of the steelmaking vessel.

Heretofore in conventional steelmaking processes such as the open hearth, electric furnaces, and BOP shops, the desired amount of fluxes are weighed out or batched into a hopper. When the desired amount of flux is in the hopper, a gate is opened and all the flux is dumped into the vessel at one time. In the Q-BOP process no space is available for storage bins and hoppers over the vessel as in conventional BOP shops. The various fluxes are therefore injected into an oxygen stream and thus carried into the vessel through the tuyeres. Various methods can be used to inject the flux into the Q-BOP converter. A co-pending patent application to William A. Kolb et al, Ser. No. 354,610, filed Apr. 25, 1973, assigned to United States Steel Corporation, and titled "Method and Apparatus for Controlling the Injection of Flux into a Steelmaking Vessel as a Function of Pressure Differential," now U.S. Pat. No. 3,871,633, granted Mar. 18, 1975, describes an automatic control system for the injection of fluxes into the Q-BOP vessel by maintaining a fixed outlet orifice on the flux tank and controlling the flow of flux via means of adjusting tank pressures. The present invention pertains to an automatic control system for the injection of the fluxes into the Q-BOP vessel by maintaining a fixed tank pressure and varying the size of the outlet orifice. In either system the manual control of the rate of flux feed becomes difficult to maintain at the desired level. The operator may not react in time or may overreact in making corrections for the continuously changing rate. Also, the manual system requires the operator's constant attention in order to maintain a given flow rate, to change from one type of flux or flow rate to another, or to take preventative measures in case the flow becomes clogged.

This invention is therefore intended to provide an automatic control system for a flux injection apparatus having a variable orifice for adjusting the flow rate, which system starts the system by automatically opening the control valves in the system in proper sequence, automatically regulates the flow of material (to the rate set by the operator), automatically stops the flow of flux when the required amount (preset by the operator) has been injected into the vessel, automatically starts another tank preset to a different rate or having a different type of flux when the first tank has delivered its set weight, automatically monitors pressure to determine clogging and automatically stops flux flow when this occurs, and automatically opens a by-pass valve in the event of a failure in the system.

SUMMARY OF THE INVENTION

The present invention provides a method and apparatus for injecting flux into the molten metal in a steelmaking vessel utilizing the Q-BOP steelmaking process. More specifically, the invention is directed to a method and apparatus for controlling the rate at which flux is injected into the oxygen stream supplied to the tuyeres of the Q-BOP vessel by controlling the size of the outlet orifice of the flux tank.

In the disclosed apparatus, oxygen is supplied to the flux injection system at two different pressures; the low pressure oxygen is supplied to the flux tank and to the flux injectin nozzle. Thus the interior of the flux tank is maintained at the same pressure as the oxygen stream into which the flux is injected. The higher pressure oxygen is supplied to the air slides of both the flux tank and the variable orifice outlet valve of the flux tank.

A load cell circuit measures the weight of flux in the tank before and during injection. The weight signal changes during injection and is compared in a feed rate control apparatus with a preset desired reference weight at any given time. The difference between the actual weight of injected material and the desired weight of injected material is supplied to a motor drive unit which controls the opening of the variable orifice valve. In this way corrections are made to the actual injection rate so as to equalize the preset reference weight at any given time and the actual weight of injected material.

The measured weight signals are also supplied to a weight control apparatus which compares the weight of flux in the tank just prior to the start of injection with the changing weight during injection. When the difference between the starting weight and the current weight (representing the amount of flux injected into the oxygen stream) reaches a predetermined total, the weight control apparatus generates a signal which causes the motor drive unit to close the variable orifice valve completely, shutting off the further flow of flux out of the tank and into the oxygen stream.

The invention also provides a device for measuring the pressure in the oxygen supply conduit downstream of the injection apparatus. When the pressure in the conduit rises above a preset allowable maximum or falls below a preset allowable minimum, the measuring device causes the motor drive to close the variable orifice valve (and stop further flux injection) and at the same time opens a by-pass valve. When the by-pass valve opens, oxygen flows directly from the source to the Q-BOP vessel, by-passing the injection apparatus.

Finally, the invention provides a system for automatically refilling the tank with flux. A pressure switch measures the internal tank pressure and when such internal tank pressure is sufficiently low, the switch allows valves to open, coupling the interior of the tank to a source of new flux and to a cyclone vent apparatus. If the internal tank pressure is too high for a proper flow of flux into the tank from the source, the switch will operate to open a venting valve and allow excess pressurizing oxygen to escape. The filling and cyclone valves will remain shut until the tank has been vented enough to reduce the internal pressure to a point where the filling operation can proceed until stopped by the operator.

DESCRIPTION OF THE PREFERRED EMBODIMENT

Figure 1:
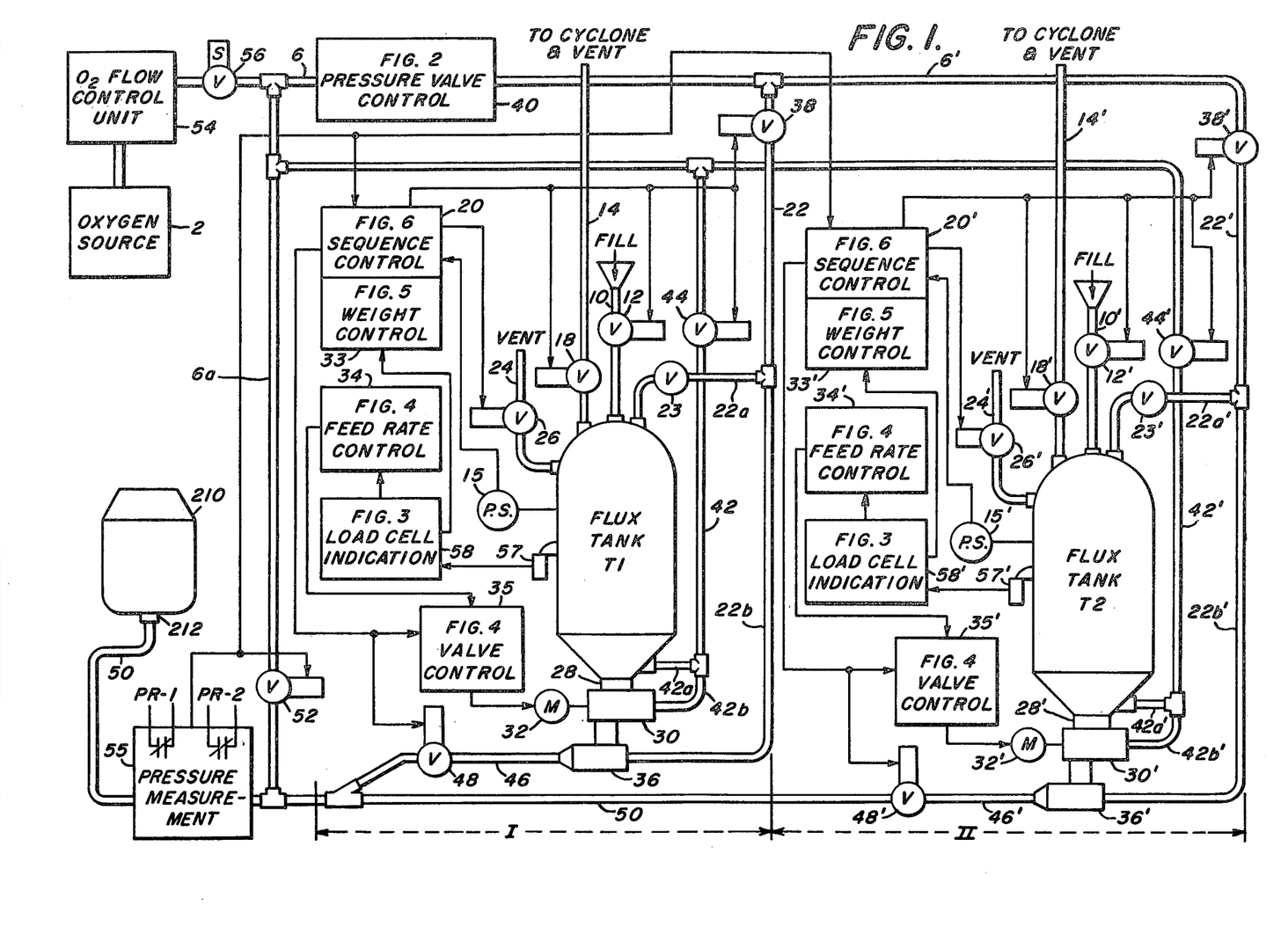
FIG. 1 shows a schematic piping diagram of a preferred embodiment of the flux injection system of this invention.

The schematic piping diagram of FIG. 1 shows two flux injection tanks T1 and T2 connected in parallel along with their corresponding input, output and control system, for injecting powdered flux into the oxygen supplied to the center pipe 213 (FIGS. 9-13) of the tuyeres 212 (FIGS. 1, 9), 214, 216, 216a, 217 (FIG. 9) of a steelmaking vessel 210 (FIG. 9) employing the Q-BOP process disclosed in detail in U.S. Pat. No. 3,705,549. Since in the present invention succeeding flux injection systems duplicate the first system I (FIG. 1), the following description will be referenced specifically to the system I for supplying flux from tank T1; the primed reference characters identifying component portions of the system II (FIG. 1) for supplying flux from tank T2 correspond to the unprimed reference characters which identify the corresponding portions of the tank T1 supply system.

Tank T1 has coupled to it a fill conduit 10 (FIG. 1) through which flux is supplied, such as by gravity feed arrangement. A relay-controlled block valve or fill valve 12 (FIG. 1) is interposed in the conduit 10 to control the supply of flux to the tank T1. A conduit 14 (FIG. 1) couples the interior of the tank T1 to a cyclone dust collector and vent (not shown) through a block valve 18 (FIG. 1) operated in conjunction with the fill valve 12. A known pressure switch 15 (FIG. 1) is coupled to the flux tank T1 and is operated by the internal pressure of the tank T1. The switch 15 opens when the pressure in the tank T1 exceeds a preset level and closes when the tank pressure falls below this level. The pressure switch 15 is electrically coupled through a sequence control unit 20 (FIG. 1, 6) to fill valve 12 and cyclone valve 18 (FIG. 1). The sequence control unit 20 is described in detail below with reference to FIG. 6.

Oxygen Supply

Figure 2:
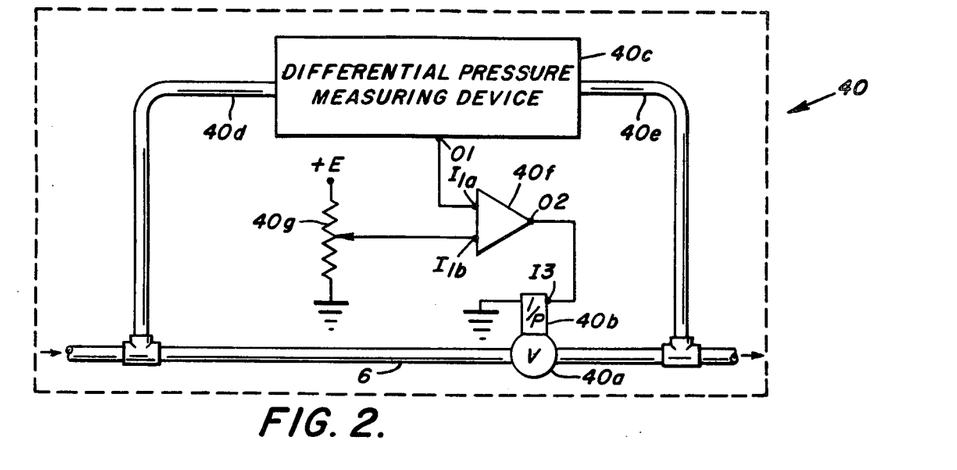
FIG. 2 shows a detail of the pressure valve control unit.

Oxygen is supplied to the flux injection apparatus from a source of oxygen 2 (FIG. 1) coupled to a conduit 6 (FIGS. 1, 2). A flow measuring and control unit 54 and block valve 56 are interposed in conduit 6 to control the flow of oxygen therethrough. This control apparatus 54, which is not a part of the present invention, is described in detail in the aforementioned Ser. No. 312,173 with particular reference to the correspondingly numbered portions of FIGS. 2 and 4 thereof.

Pressure Valve Control Unit 40

A pressure valve control unit 40 (FIGS. 1, 2) is interposed in conduit 6 to create and maintain a constant pressure drop of approximately 20 psi in normal operation in the oxygen stream. A conduit 22 is coupled to the outlet portion of pressure valve control unit 40 through a block valve 38 (FIG. 1). The conduit 22 is coupled through a branch conduit 22a to the flux tank T1 through a check valve 23 (FIG. 1) to prevent back flow of gases and for the purpose of pressurizing the tank T1 with oxygen supplied from the oxygen source 2 through the pressure valve control system 40. A vent line 24 (FIG. 1) is coupled to the flux tank T1 for controlling the pressure in the tank T1 by means of a vent valve 26 (FIG. 1) interposed in vent line 24 and operated by the aforementioned sequence control unit 20.

Valve 30

At the bottom of tank T1 is an outlet orifice 28 (FIG. 1) which orifice 28 is connected to a Claudius-Peters valve 30 (FIGS. 1,3) of the type described in German Pat. No. 1,259,775. The Claudius-Peters valve 30 is driven by a motor drive 32 (FIGS. 1,4) and operates to effectively vary the size of the tank outlet 28 to control the amount and rate of flux injected into the oxygen stream. The drive unit 32 may be a worm-gear arrangement and can be driven in forward or reverse directions to open or close the valve 30. The motor drive 32 is controlled by a feed rate control system 34 (FIGS. 1, 4) and valve control system 35 (FIG. 1) described below with reference to FIGS. 3 and 4. The outlet of the valve 30 is coupled to a flux injection nozzle 36 (FIG. 1) through which the controlled amount of flux is injected into the oxygen stream supplied through a branch 22b (FIG. 1) of conduit 22.

Tank T1

The tank T1 (FIG. 1) is constructed with an air slide loosening device (not shown) adjacent the outlet 28 for preventing the powdered flux from caking and thus inhibiting the efficient flow of flux out of the tank. This air slide arrangement is conventional and consists essentially of a screen grid (not shown) over which air, or in the present case, oxygen, is blown to fluff the powdery flux and keep it circulating while at the same time allowing it to be fed through the outlet 28. The fluffing stream for the air slide is supplied by a conduit 42a (FIG. 1) coupled to the flux tank T1 which conduit 42a forms one branch of a conduit 42. A second branch conduit 42b (FIG. 1) is coupled to the Claudius-Peters valve 30 to supply a stream of gas for the corresponding air slide loosening device (not shown) located in this valve 30. Conduit 42 is coupled to the main oxygen conduit 6 on the upstream (high pressure) side of the pressure valve control unit 40 through a block valve 44 (FIG. 1) operated by the sequence control system 20.

Flux Outlet

The outlet of the flux injection nozzle 36 is coupled to the Q-BOP vessel 210 (FIGS. 1, 9) through a conduit 46 (FIG. 1) and an outlet valve 48 (FIG. 1) (interposed in conduit 46 and operated by the sequence control unit 20) and a conduit 50 (FIGS. 1, 9–13) to which conduit 50 is also coupled conduit 46' from flux injection system II.

Oxygen By-Pass

The oxygen supply conduit 6 also contains a by-pass portion 6a (FIG. 1) coupled between the high pressure (upstream) side of pressure valve control system 40 and the conduit 50 downstream of its coupling with conduit 46; this permits the flux injection apparatus to be by-passed and allows oxygen to be supplied directly to the Q-BOP vessel 210 (FIGS. 1, 9) from the oxygen source 2. Oxygen flow through this by-pass portion is controlled by a block valve 52 (FIG. 1) interposed in the conduit 6a.

Pressure Measurement Device 55

Figure 6:
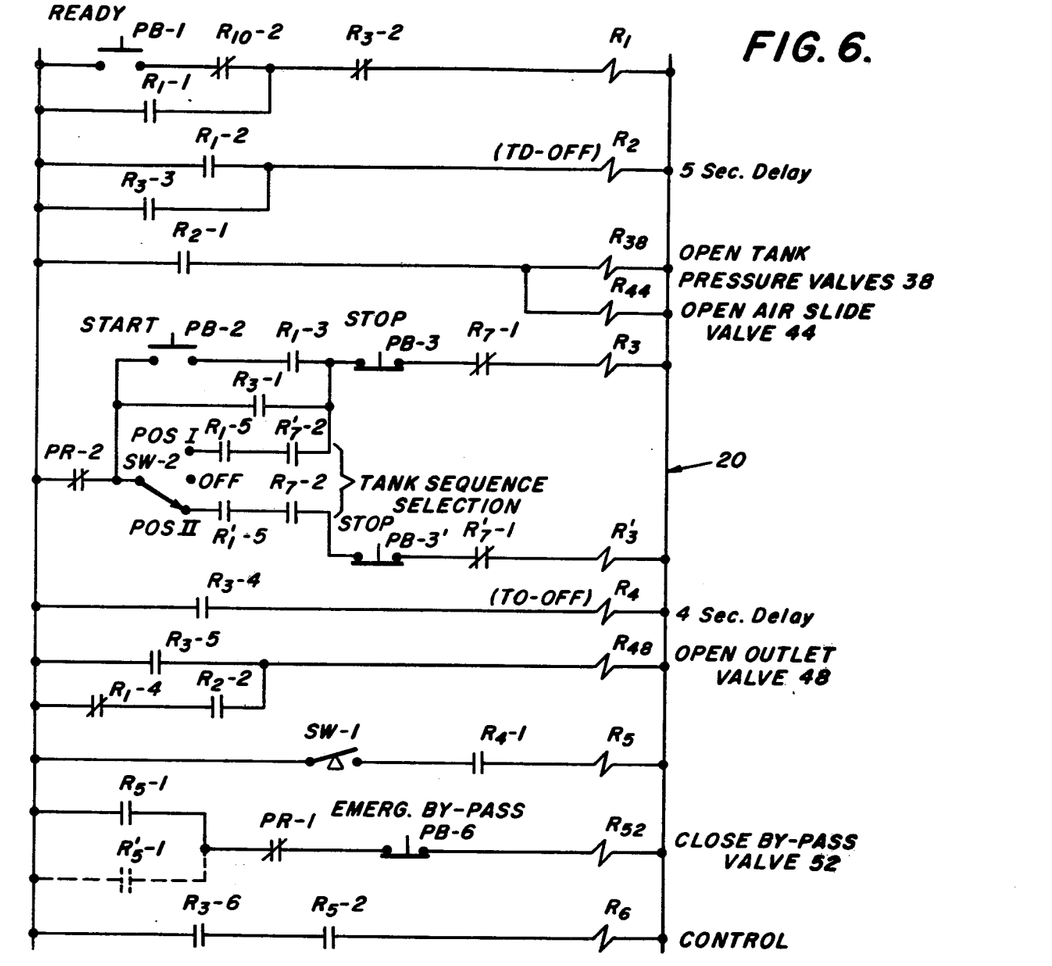
FIG. 6 is a schematic control diagram showing the flux injection portion of the operation of the system.

A known pressure measurement device 55 (FIG. 1) is coupled to the conduit 50 downstream of the junction of by-pass 6a and conduit 50. The measurement device 55 incorporates a known meter relay device represented by normally closed relay contacts PR-1 and PR-2 (FIG. 6). The pressure measurement device 55 produces an electrical output signal representative of the pressure measured in the supply conduit 50 and this output is coupled to the by-pass valve 52 and sequence control system 20. When the measured pressure falls outside the upper or lower limits of a preset acceptable range, measurement device 55 produces an output signal to energize a relay (not shown) and opens contacts PR-1 and PR-2 which causes flux injection to stop and the by-pass valve 52 to open.

Pressure Valve Control Unit 40 (FIG. 2)

In the operation of the flux injection systems I and II (FIG. 1) of the present invention, it is necessary to supply oxygen to various parts of the systems I and II at two different pressures. Thus conduits 22a and 22b (FIG. 1) supply pressurizing oxygen to flux tank T1 and injection nozzle 36 at a lower pressure than that supplied to the aforementioned air slides (not shown) by conduits 42a and 42b (FIG. 1). This pressure differential is obtained through the agency of the pressure valve control unit 40, shown in detail in FIG. 2, which is interposed in the oxygen supply conduit 6 and maintains a constant pressure drop of about 20 psi in normal practice between its input and output.

The pressure valve control unit 40 includes a control valve 40a (FIG. 2) interposed in the supply conduit 6. The valve 40a is coupled to and operated by a current-to-pressure converter 40b (FIG. 2) of known type. A differential pressure measuring device 40c (FIG. 2), also of known type, is coupled by conduits 40d and 40e (FIG. 2) to the upstream and downstream sides, respectively, of the valve 40a. The measuring device 40c measures the difference in pressure between conduits 40d and 40e and generates an electrical output signal representative of the measured pressure differential. The electrical output 01 (FIG. 2) of measuring device 40c is coupled to one input I1a of a comparator 40f, the other input I1b of which is coupled to the variable tap of a potentiometer 40g. The output 02 (FIG. 2) of comparator 40f is coupled to the input I3 of current-to-pressure converter 40b.

In practice, the desired pressure differential between the input and output of control system 40 is preset by the operator on potentiometer 40g. The electrical output signal received at I1a proportional to the pressure differential measured by device 40c is compared in comparator 40f with the preset desired differential. The current output 02 of comparator 40f represents the difference between the measured and desired pressure differentials and is applied to the current-to-pressure converter 40b to appropriately adjust the opening or closing of valve 40a, thereby controlling the flow of oxygen through the valve 40a to achieve the desired pressure differential. As a safety feature, the valve 40a is normally not allowed to close more than a maximum of about 50% in order that a flow of oxygen will be maintained in the event of a failure elsewhere in the system.

Figure 3:
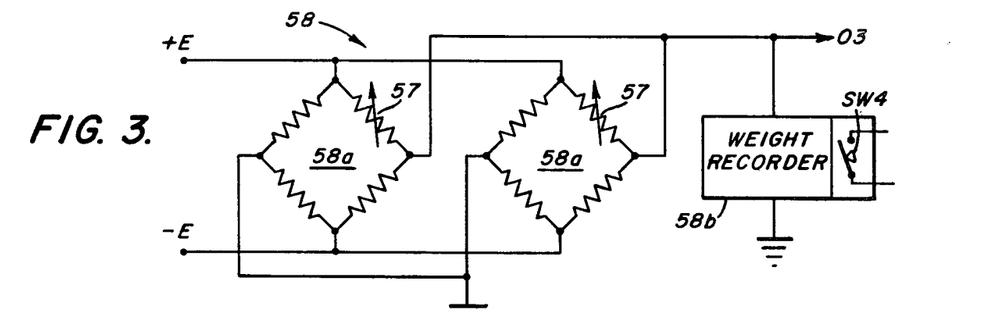
FIG. 3 shows a circuit diagram of the load cell weight measuring apparatus.

Flux Weight Measurement System (FIG. 3)

The rate at which flux is supplied from the tank T1 (FIG. 1) through the outlet 28 and valve 30 into the oxygen stream via injection nozzle 36 and the total amount of flux so supplied are controlled by a feed rate control unit 34 (FIGS. 1, 4) and weight control unit 33 (FIGS. 1, 5), respectively. Both of these control units 33, 34 are responsive to measurements made by a load cell measuring conduit 58 of the weight of flux in the tank T1 before and during the injection process.

A number of load cells 57 (FIGS. 1, 3) are coupled to the flux tank T1 symmetrically around its circumference and are coupled to the load cell measuring and weight indicating circuit 58. The load cells 57 each comprise one leg of impedance bridges 58a connected in parallel. FIG. 3 shows an exemplary embodiment employing two load cells 57, it being a simple expedient to connect as many corresponding bridges 58a in parallel succession as desired. The output 03 (FIGS. 3–5) of the load cell measuring circuit 58 is coupled to a recorder 58b (FIG. 3) of any known type, such as a chart recorder, which is provided to keep a permanent record of the flux feed operation.

Figure 4:
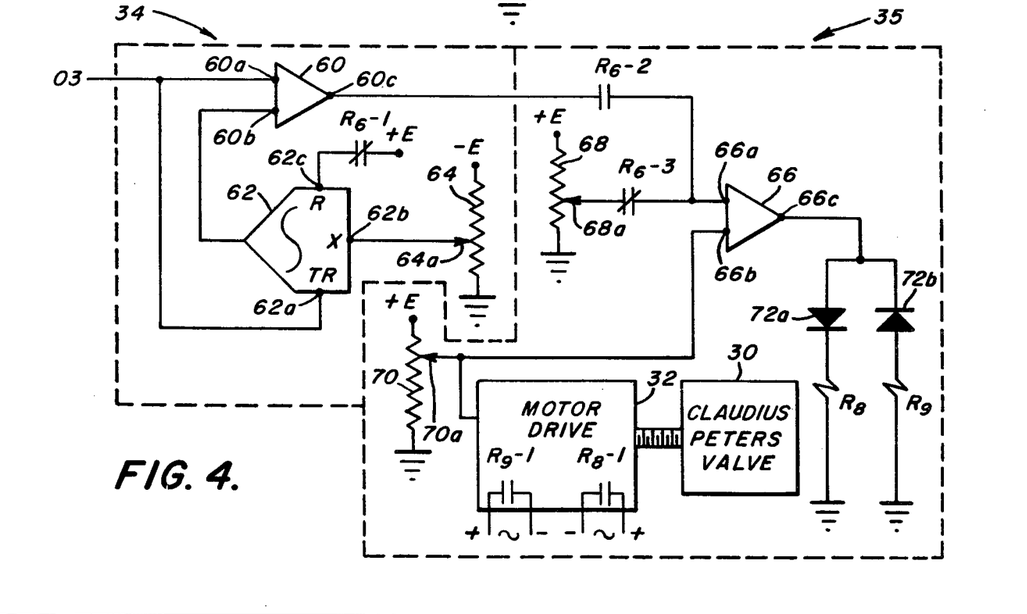
FIG. 4 shows a circuit diagram of the flow rate control apparatus.

Flux Feed Rate Control Unit 34 (FIG. 4)

The output 03 of the load cell measuring circuit 58 is also coupled to the input of the feed rate control system 34 shown in detail in FIG. 4.

More specifically, the output 03 of load cell circuit 58 is coupled to an input 60a (FIG. 4) of an adder/subtractor 60 and to the tracking input 62a of a track and hold integrating amplifier circuit 62 (FIG. 4). Both items 60 and 62 are commercially available in modular form. (For example, amplifier 62 may be of the type sold by Consolidated Electrodynamics Co., De Var-Kinetics Division, Type 19-400 Series, Dynamic Response Module). The integrating function input 62b (FIG. 4) of amplifier 62 is coupled to the adjustable tap 64a of a potentiometer 64 (FIG. 4) connected across the negative and common terminals of a source of D.C. voltage. The function of the potentiometer 64 is to adjust the rate of integration of circuit 62, the output of which represents what the correct amount of weight of flux remaining in the tank T1 should be at any given time. The trigger input 62c (FIG. 4) is coupled to a source of positive voltage E through the normally closed contacts $R_6$-1 (FIG. 4) of a feed rate control relay $R_6$ (FIG. 6). When relay $R_6$ is de-energized, circuit 62 (FIG. 4) is in the tracking mode and its output signal follows the measured weight signal appearing at tracking input 62a. When relay $R_6$ is energized, the normally closed contacts $R_6$-1 are opened and the circuit 62 is triggered to couple input 62b to potentiometer 64 in an integrating mode. The signal appearing on the tracking input 62a at the time the operating mode of circuit 62 is switched is held and forms the initial condition for the integration. Adjusting the tap 64a (FIG. 4) of potentiometer 64 results in a variation in the integration function of circuit 62. The integration corresponds to the desired flux feed rate, as set by the appropriately calibrated potentiometer 64. Therefore, the desired rate of flux feed from tank T1 into the oxygen stream can be varied as required by the particular operating conditions.

The output of circuit 62 is coupled to a second input 60b of the adder/subtractor 60. The signal appearing at input 60b, during the operating mode, decreases at a rate proportional to the setting on potentiometer 64. This signal represents the weight of flux which should be remaining in tank T1 if the correct, desired rate of flux injection is occurring. The output 60c (FIG. 4) of circuit 60 is coupled to the input 66a (FIG. 4) of the valve control unit 35 (FIGS. 1, 4). The signal appearing at the output 60c of circuit 60 (and thus the input 66a of unit 35) represents the difference between the amount of flux injected at a given time and the desired amount at that time as set by the operator. As will be understood by one skilled in the art, the circuits can be designed so that the signals appearing at 60a and 60b can either represent the actual and desired amounts of injected flux, respectively, or the signals 60a and 60b can represent the actual and desired amounts of flux remaining in tank T1. In either case a signal is generated at 60c which represents any differential between the actual and the desired weight of flux which should have been injected at any given time.

Valve Control Unit 35 (FIG. 4)

The output 60c of the feed rate control circuit 34 is coupled to one input 66a of a known comparator 66 of valve control circuit 35 through the normally open contacts $R_6$-2 (FIG. 4) of relay $R_6$ (FIG. 6). Input 66a is also coupled through normally closed contacts $R_6$-3 to the adjustable tap 68a of a potentiometer 68. The other input 66b is coupled to the adjustable tap 70a of the potentiometer 70. Tap 70a is also coupled to the motor drive 32 (FIGS. 1, 4) to provide an operating voltage level for the latter. The output 66c of the comparator 66 (FIG. 4) is coupled in parallel to opposed diodes 72a and 72b (FIG. 4). The coil of a relay $R_8$ is coupled between the anode of diode 72a and ground and the coil of a relay $R_9$ is coupled between the cathode of diode $72b$ and ground.

Motor drive 32

The motor drive 32 includes, in one commercially available unit, two groups of relay contacts represented, for the sake of simplicity, by contacts $R_8$-1 and $R_9$-1 which contacts (when closed upon the corresponding one of relays $R_8$ and $R_9$ being energized) connect the motor drive unit 32 alternatively to a three-phase A.C. source to drive the motor 32 in either the forward or reverse directions, respectively.

Comparator 66 (FIG. 4) compares the output signal from circuit 34 which may vary during the flux injection process, or a corresponding manually preset signal, depending upon the state of relay $R_6$ (FIG. 6), with the signal representing the operating voltage of the motor drive 32 and thus the position of the Claudius-Peters valve 30. When the measured amount of flux injection exceeds the desired amount preset on potentiometer 64, a positive-going signal will appear at the output $60c$ of comparator 66 and relay $R_8$ will be energized. Relay contacts $R_8$-1 will therefore close to drive the motor 32 in the forward direction, closing the valve 30 and reducing the rate of flux injection into the oxygen stream. When a negative-going signal appears at the output $66c$ of comparator 66, relay $R_9$ will be energized to close contacts $R_9$-1 and drive the motor 32 in a reverse direction to open the valve 30 and increase the rate of flux injection into the oxygen stream to bring it up to the level preset on potentiometer 64.

Figures 5, 8:
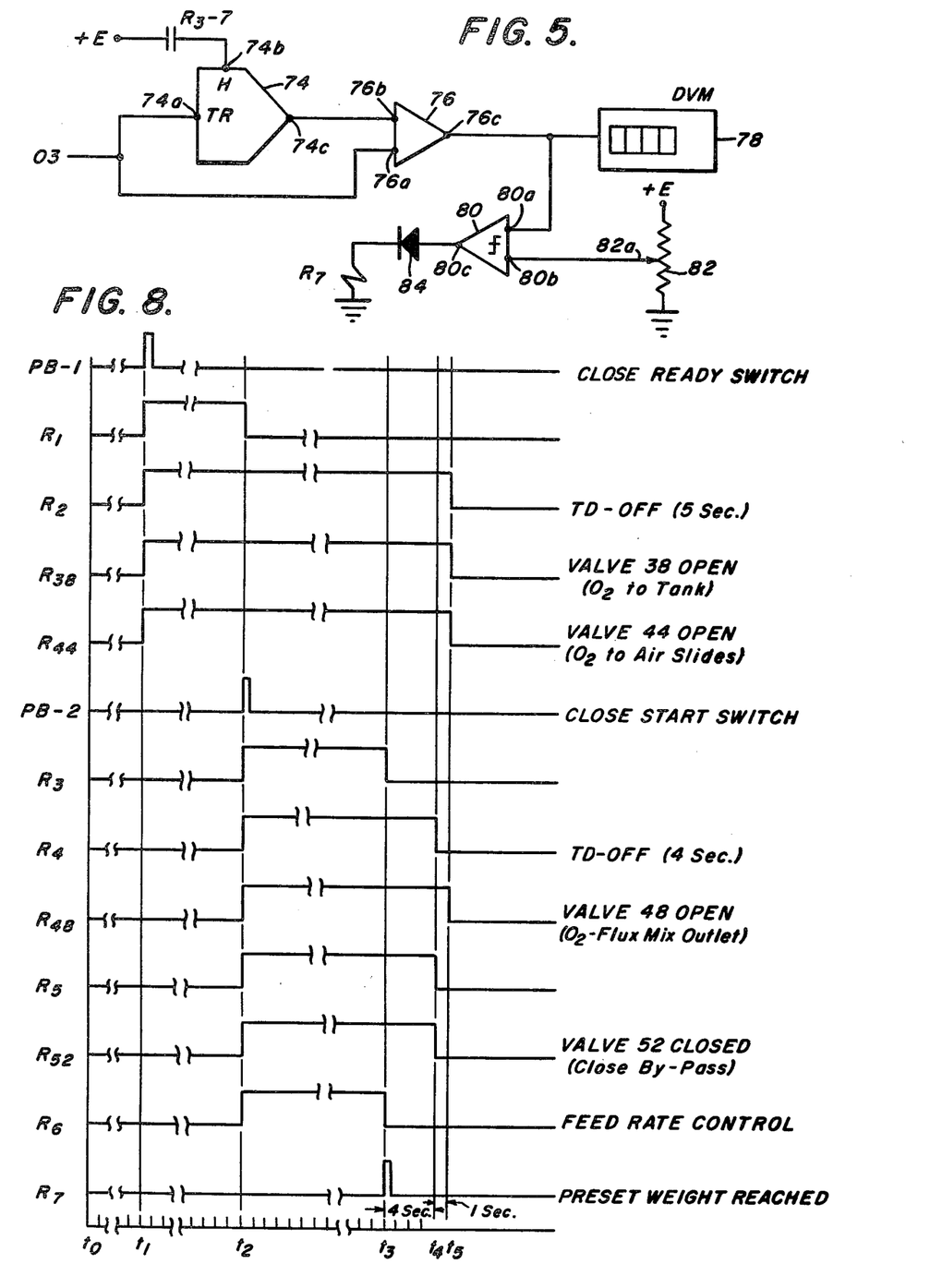
FIG. 5 shows a circuit diagram of the apparatus for controlling the total amount of flux injected into the oxygen stream to the Q-BOP vessel.
FIG. 8 is a timing diagram for the operation of the flux injection system.

Flux Weight Control Unit 33 (FIG. 5)

The portion of the control circuitry shown in FIG. 5 is specifically directed to controlling the total amount of flux injected into the oxygen stream from the tank T1 by controlling the state of a relay $R_7$ (FIGS. 5, 8). The operation of this feed control circuit is based on the weight signal produced from output 03 (FIG. 3) of the load cell bridge circuits 58 (FIG. 3) described earlier.

In this aspect of the invention, the output 03 (FIG. 5) of the load cell circuit 58, representing the weight of the flux in tank T1 as well as the weight of the tank T1 itself, is coupled to the signal tracking input $74a$ of a track and hold amplifier 74 and also to one input $76a$ of an adder/subtractor 76. The hold trigger input $74b$ (FIG. 5) is coupled to a source of positive voltage E through normally open relay contacts $R_3$-7. The output $74c$ (FIG. 5) of track and hold amplifier 74 is coupled to the second input $76b$ of adder/subtractor 76. The output $76c$ of adder/subtractor 76 is in turn coupled to a digital voltmeter 78 calibrated to indicate the amount of flux which has left the tank T1 and been fed into the oxygen stream. The output of adder/subtractor 76 is also coupled to one input $80a$ of a comparator 80. These devices are all well known and are commercially available in modular form. An appropriately calibrated reference potentiometer 82 (FIG. 5) is coupled through its adjustable tap $82a$ to a second input $80b$ of comparator 80 to provide a signal representing the total weight of flux which is desired to be fed into the oxygen stream from the flux tank T1. In the preferred embodiment, the voltages compared in comparator 80 are of opposite sign and the polarity of their sum is an indication of their relative magnitudes. The point of change in polarity provides a trigger for the high gain operational amplifier portion of the comparator 80 to cause its output voltage $80c$ (FIG. 3) to swing from one extreme value to the other. The output $80c$ of the comparator 80 is coupled to the energizing coil of relay $R_7$ (FIGS. 5, 8). Relay $R_7$, when energized by the output $80c$ from comparator 80, causes valve 30 to close (in a manner to be described below) to shut off the flow of flux from the flux tank T1 into the oxygen stream.

Prior to the start of the injection operation, track and hold amplifier 74 is in its tracking mode; thus its output $74c$ closely follows its input $74a$, $74b$. The output $76c$ of adder/subtractor 76 reflects this zero difference between its inputs $76a$, $76b$ and the output $80c$ of comparator 80 is at the extreme value which prevents relay $R_7$ from being energized, i.e. the output of the comparator 80 is negative and diode 84 is back-biased so that no energizing current flows through the coil of relay $R_7$. When the flux injection operation is initiated, normally open relay contacts $R_3$-7 close to switch track and hold amplifier 74 into its holding mode to hold the last weight value measured by the load cell measuring circuit 58. As flux flows out of the tank T1, the output signal 03 from the load cell circuit 58 changes proportionally. This causes the output $76c$ of the adder/subtractor 76 to also change proportionally, with an increasing magnitude. When the magnitude of the output signal $76c$ from the adder/subtractor 76, appearing at input $80a$ of comparator 80, exceeds that of the output signal from the potentiometer 82, appearing at the other input $80b$ and of opposite polarity from the first input $80a$, the output signal $80c$ from the comparator 80 shifts to the other extreme value and diode 84 becomes forward-biased to allow current to flow to energize relay $R_7$.

Sequence Control Unit 20 (FIG. 6)

The operation of the control system of this invention will be described below with particular reference to the control diagram of FIGS. 6 and 8 in connection with the other figures.

The flux injection operation according to this invention is initiated when the operator presses the momentary-contact READY push button PB-1, located at the operator's console, at time $t_1$ (FIG. 8) to energize relay $R_1$ (unless otherwise noted, all relays are energized by connecting their respective coils across the voltage source E). Normally open holding relay contacts $R_1$-1 (FIG. 6) are connected in parallel with the series combination of READY switch PB-1, normally closed relay contacts $R_{10}$-2, FIG. 6, (described below with reference to FIG. 7), and normally closed contacts $R_3$-2, and are closed upon relay $R_1$ being energized to maintain the latter in its energized state.

At the same time, normally open contacts $R_1$-2 close to energize relay $R_2$. This relay $R_2$ (FIG. 6) is a time-delay-off relay (indicated by the legend TD-OFF); when energized, relay $R_2$ picks up with no measurable delay but when de-energized drops out only after a predetermined time delay which, in the case of the disclosed embodiment, is a five second delay. When relay $R_2$ picks up, normally open contacts $R_2$-1 (FIG. 6) close to energize relays $R_{38}$ and $R_{44}$ to cause valves 38 and 44 (FIG. 1), respectively, to open. Opening valve 38 permits tank T1 to be pressurized by oxygen supplied from the (low pressure) output of pressure valve control unit 40 (FIGS. 1, 2) through conduit 22 (FIG. 1) and branch conduit $22a$. Opening valve 44 (FIG. 1) supplies oxygen to the air slides (not shown) of the flux tank T1 and valve 30 through branch conduits $42a$ and $42b$ (FIG. 1) and conduit 42 coupled to the upstream (high pressure) side of control unit 40.

After the tank T1 has been pressurized, the operator presses momentary-contact START switch PB-2 (FIG. 6) at time $t_2$ (FIG. 8) to energize relay $R_3$. Normally open contacts $R_1$-3 are interposed in series with switch PB-2 as a safety feature to prevent the operator from inadvertently energizing relay $R_3$ before relay $R_1$ has been energized to pressurize the flux tank $T_1$. Normally open holding contacts $R_3$-1 are connected across the series combination of switch PB-2 and contacts $R_1$-3. When relay $R_3$ picks up, holding contacts $R_3$-1 close to maintain relay $R_3$ in its energized state after the operator releases switch PB-2. At the same time, normally closed contacts $R_3$-2 connected in series with relay $R_1$ open to de-energize relay $R_1$. Normally open contacts $R_3$-3 (FIG. 6), connected in parallel with contacts $R_1$-2, close to maintain $R_2$ in its energized state when contacts $R_1$-2 open upon relay $R_1$ dropping out. Oxygen flow to the tank T1 and the air slides (not shown) is therefore maintained during the actual injection operation.

Figure 9:
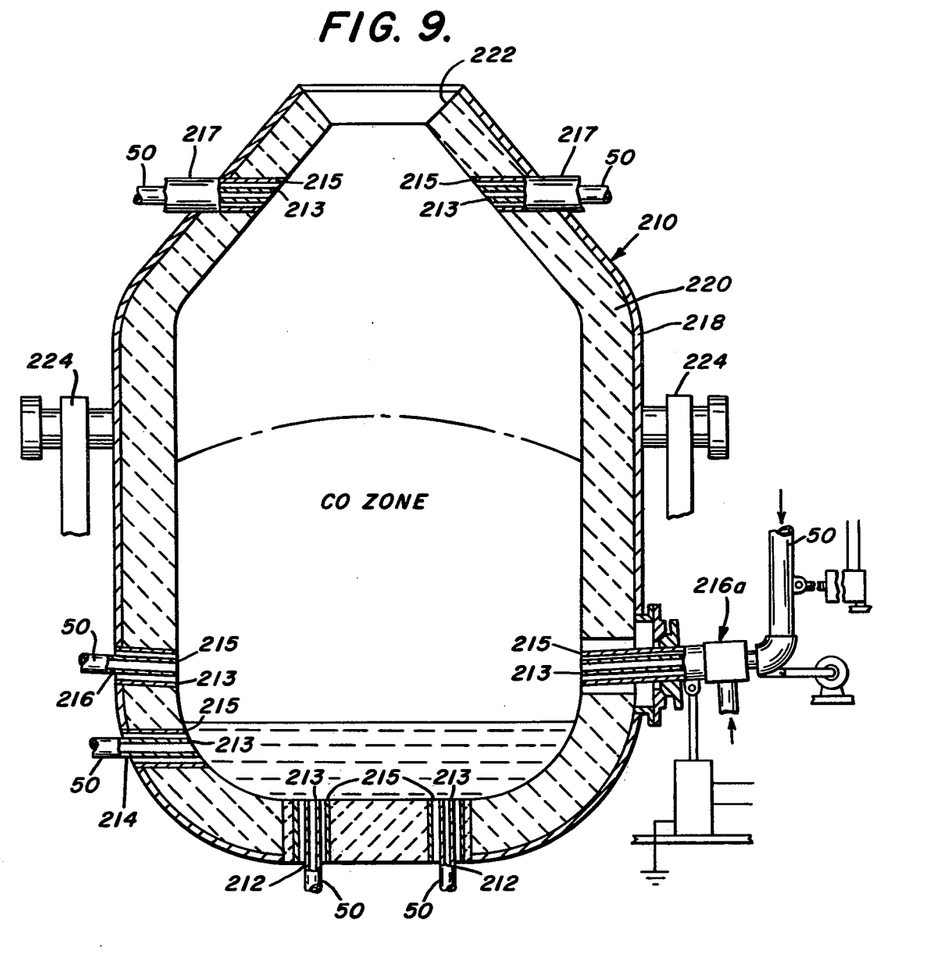
FIG. 9 is a vertical sectional view of a Q-BOP converter showing the use of the method and apparatus of the present invention with bottom submerged tuyere, a side submerged tuyers, side tuyeres and mouth tuyeres.

When relay $R_3$ is energized, normally open contacts $R_3$-4 (FIG. 6) close to energize relay $R_4$. Relay $R_4$ picks up with no measurable delay but is de-energized, upon the opening of contacts $R_3$-4, only after a predetermined time delay as indicated by the legend TD-OFF. In the preferred embodiment, this delay is of four seconds duration. Normally open contacts $R_3$-5 (FIG. 6) close when relay $R_3$ picks up to energize relay $R_{48}$, thereby opening valve 48 (FIG. 1) and allowing the outlet conduit 46 (FIG. 1) to communicate with conduit 50 and the steelmaking vessel 210 (FIGS. 1, 9).

When valve 48 opens, an oxygen flow path is completed from the source 2 (FIG. 1) through the flow control unit 54 and valve 56, conduit 6, pressure control unit 40, conduits 22 and 22b, injection nozzle 36, outlet conduit 46, valve 48, conduit 50 and pressure measurement device 55 to the Q-BOP vessel 210. Opening valve 48 also causes a limit switch SW-1 (FIG. 6) to close. Limit switch SW-1 is connected in series with normally open contacts $R_4$-1 (which contacts $R_4$-1 close when relay $R_4$ picks up) and the coil of relay $R_5$ (FIG. 6). When relay $R_5$ is energized, normally open contacts $R_5$-1 close to energize relay $R_{52}$. Energizing relay $R_{52}$ (FIG. 6) causes the normally open by-pass valve 52 (FIG. 1) to close as long as relay $R_{52}$ remains up. Contacts $R'_5$-1 of relay $R'_5$ (sequence control unit 20' associated with tank T2) are coupled in parallel with contacts $R_5$-1; contacts $R'_5$-1 and $R_5$-1 will each energize relay $R_{52}$, depending upon which flux injection system (I or II) is operating.

Normally open contacts $R_3$-6 and $R_5$-2 (FIG. 6) are coupled in series with the coil of relay $R_6$. When relays $R_3$ and $R_5$ are energized in the manner described above, contacts $R_3$-6 and $R_5$-2 close to pick up relay $R_6$ and start the feed rate control system 34 (FIG. 4) operating. When relay $R_6$ picks up, normally closed contacts $R_6$-1 (FIG. 4) open to shift the amplifier circuit 62 from its tracking mode to its integrating mode. At the same time, normally open contacts $R_6$-2 (FIG. 4) and normally closed contacts $R_6$-3 (FIG. 4) close and open, respectively, to provide comparator 66 with an input 66a corresponding to the difference between the measured and preset flux injection weights, rather than the value received from the close setpoint potentiometer 68 that keeps the Claudius-Peters valve 30 closed.

When the operator presses START switch PB-2 (FIG. 6) to begin flux injection and start the flux rate control system 34 (FIG. 4) operating, normally open contacts $R_3$-7 (FIG. 5) close to shift track and hold amplifier circuit 74 into its hold mode from its tracking mode to hold the last reading of the weight measured by the load cell measuring circuit 58 (FIG. 3). This held last reading is then compared in the adder/subtractor 76 (FIG. 5) with the current weight signal 03 measured by the load cell circuit 58 as flux is fed out of the tank T1. When the measured amount of flux injected into the oxygen stream through valve 30 (FIG. 1) and injection nozzle 36 reaches the desired total preset by the operator on potentiometer 82, the output of comparator 80 (FIG. 5) changes state to energize relay $R_7$ (FIG. 5) at time $t_3$ (FIG. 8) and open normally closed contacts $R_7$-1 (FIG. 6), thereby de-energizing relay $R_3$. When relay $R_3$ drops out, contacts $R_3$-2 (FIG. 6) close to allow the operator to recycle the injection operation by again depressing the READY push button PB-1. At the same time, contacts $R_3$-3 (FIG. 6) open to de-energize time delay relay $R_2$ after a five second delay. Contacts $R_3$-4 (FIG. 6) open to de-energize relay $R_4$ after a four second delay. Contacts $R_3$-6 (FIG. 6) open to drop out relay $R_6$ with no measurable delay. This causes contacts $R_6$-1 (FIG. 4) to close and return circuit 62 to its tracking mode, and causes contacts $R_6$-2 (FIG. 4) to open and $R_6$-3 (FIG. 4) to close. This latter action causes motor drive 32 (FIGS. 1, 4) to return the valve 30 to its closed position. The valve 30 is closed as a function of a comparison between the operating level set on potentiometer 70 (FIG. 4) and the level set on potentiometer 68 (FIG. 4). The difference between these two levels as measured in the comparator 66 (FIG. 4) produces a signal which causes relay $R_8$ (FIG. 4) to be energized, thus closing contacts $R_8$-1 (FIG. 4) and operating motor drive 32 in the forward direction an amount sufficient to close the valve 30.

Normally closed contacts $R_1$-4 (FIG. 6) and normally open contacts $R_2$-2 are connected in series across contacts $R_3$-5 to maintain relay $R_{48}$ energized for five seconds after relay $R_3$ drops out, thus opening contacts $R_3$-5. A flow path is therefore maintained through conduit 46 (FIG. 1) for a short period of time after the injection operation ceases to clear out any residual flux which may be injected into the oxygen stream during the time that it takes for the valve 30 to close.

Four seconds after relay $R_3$ (FIG. 6) drops out, relay $R_4$ drops out at time $t_4$ (FIG. 8), thus de-energizing relay $R_5$ and opening contacts $R_5$-1. When contacts $R_5$-1 open, relay $R_{52}$ drops out, causing by-pass valve 52 to open and establish a flow of oxygen directly to the Q-BOP vessel 210 (FIGS. 1, 9) from the main supply conduit 6.

Five seconds after relay $R_3$ drops out, thus opening contacts $R_3$-3, relay $R_2$ drops out at time $t_5$ (FIG. 8), thereby opening contacts $R_2$-2 and thereby dropping out relay $R_{48}$ to cause outlet valve 48 to close. Thus there is a one second overlap period during which oxygen flows through the by-pass path and through the flux injection path, thus avoiding the possibility of unintentional pressure drops in the oxygen flow which might result in damage to the tuyeres 212 (FIGS. 1, 9) of the Q-BOP vessel 210 during the changeover from the flux injection to the by-pass paths.

When relay $R_2$ drops out, contacts $R_2$-1 (FIG. 6) open to drop out relays $R_{38}$ and $R_{44}$, thereby closing tank pressure valve 38 and air slide valve 44, respectively, and shutting off the pressurizing flow of oxygen to the tank T1 and the flow to the air slides (not shown) of the tank T1 (FIG. 1) and the valve 30.

In addition to the above-described automatic shut-off operation, a normally closed STOP push button PB-3 (FIG. 6) is connected in series with the coil of relay $R_3$. Thus, depressing the STOP button PB-3 is the manual equivalent of energizing relay $R_7$ (FIG. 5) and opening contacts $R_7$-1 (FIG. 6) with the resultant sequential closing operations.

Emergency By-Pass Control (FIG. 6)

As mentioned earlier in this description, the pressure measurement device 55 (FIG. 1) incorporates a known meter relay device (not shown) represented by normally closed contacts PR-1 and PR-2 (FIGS. 1, 6). The meter relay operates to open these contacts PR-1, PR-2 when the pressure in the supply conduit 50 measured by device 55 falls outside the upper and lower limits of a preset acceptable range, indicating a blockage in the conduit 50 either downstream or upstream of the measurement device 55. Contacts PR-1 are coupled in series with relay $R_{52}$ (FIG. 6) and contacts PR-2 are coupled in series with relay $R_3$ (FIG. 6). When the measured pressure falls outside the acceptable range, contacts PR-1 open to drop out relay $R_{52}$ and open by-pass valve 52 (FIG. 1). At the same time, contacts PR-2 open to drop out relay $R_3$, thereby shutting off the flux injection operation with the aforementioned sequence of steps.

A manual emergency by-pass control is provided by means of a momentary-break push button switch PB-6 (FIG. 6) located at the operator's console. When depressed, this switch PB-6 breaks the energizing circuit to the coil of relay $R_{52}$ which drops out, thus allowing by-pass valve 52 to open.

Flux Tank Sequence Selection (FIG. 6)

It is often the case that different types of flux are to be injected into the oxygen stream from separate flux tanks T1, T2 in sequence. This is accomplished in the present invention by the sequence selection control, at the heart of which is the SEQUENCE SELECTOR switch SW-2 (FIG. 6). In one form of embodiment, this switch SW-2 is a three-position center OFF switch located at the operator's console. The first operating position (POS I) of the switch SW-2 (FIG. 6) is coupled through the series combination of normally open relay contacts $R_1$-5 and $R'_7$-2 to the coil of relay $R_3$. Contacts $R'_7$-2 (FIG. 6) are normally open contacts of a relay $R'_7$ comprising a portion of the flux weight control unit 33' associated with tank T2 (FIG. 1). Similarly, the second operating position (POS II) of switch SW-2 is coupled to a relay $R'_3$ (of sequence control unit 20' associated with tank T2) through the series combination of contacts $R'_1$-5 and $R_7$-2. As noted earlier, the primed reference characters are associated with injection system II or tank T2.

Each injection system I and II (FIG. 1) has its own READY and START push buttons PB-1, PB-2, etc. In order to inject flux sequentially from the tanks T1, T2, it is necessary that each READY push button PB-1 or PB-1' be depressed by the operator to pressurize each tank T1, T2 individually. In the disclosed embodiment, the injection sequence can be I and then II or vice versa. If the first mentioned sequence is desired, switch SW-2 is placed in position II and the START button PB-2 for system I is depressed. Since both READY push buttons PB-1, PB-1' have previously been depressed, contacts $R_1$-5 and $R'_1$-5 will be closed. When injection from tank T1 has been completed in the manner described above, relay $R_7$ picks up and contacts $R_7$-2 close to complete a circuit through and energize relay $R'_3$ of system II. This has the same effect as would depressing the START button PB-2' of sequence control unit 20' associated with tank T2.

If the reverse sequence is chosen, SELECTOR switch SW-2 is moved to POS I and START button PB-2' is depressed. Relay $R'_7$ picks up upon the completion of flux injection from tank T2, thus closing contacts $R'_7$-2 and energizing relay $R_3$. The injection of flux from tank T2 will shut down and that from tank T1 will commence in the appropriate sequences described above.

Figure 7:
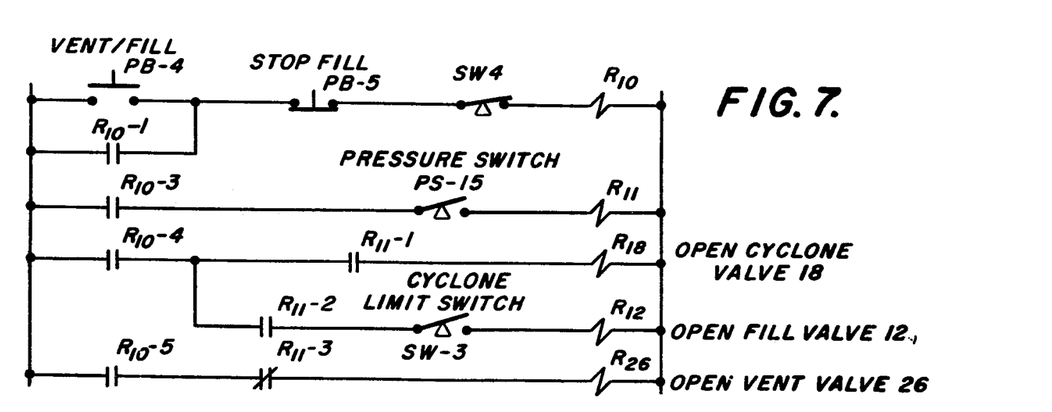
FIG. 7 is a schematic control diagram of the operation of refilling the flux tank.

Flux Tank Fill Control (FIG. 7)

The control system for filling the tank T1, for example, with flux prior to the start of the injection operation will be described below with reference to the control diagram of FIG. 7 in connection with the other figures, especially FIG. 1.

The flux tank filling operation runs essentially independently of the injection operation. The injection operation, however, cannot be initiated while the filling operation is in progress, as will be described in more detail below. When the operator depresses momentary contact VENT AND FILL push button PB-4, a circuit is completed through the source to the coil of relay $R_{10}$, thus causing it to become energized. Holding contacts $R_{10}$-1 connected across switch PB-4 close to maintain relay $R_{10}$ in its energized state after the operator releases the switch PB-4.

At the same time, normally closed contacts $R_{10}$-2 (FIG. 6), connected in series with the READY push button PB-1, open to prevent relay $R_1$ from being energized in the event that the operator depresses the READY push button PB-1 before the filling operation has been completed.

The filling operation is controlled by the operation of the pressure switch PS-15 (FIGS. 1, 7) which measures the pressure inside the flux tank T1. If the tank pressure is sufficiently low, switch PS-15, connected in series with normally open contacts $R_{10}$-3 and the coil of relay $R_{11}$, close. When contacts $R_{10}$-3 close upon relay $R_{10}$ picking up, relay $R_{11}$ becomes energized also.

When both relays $R_{10}$ and $R_{11}$ (FIG. 7) are energized, series connected normally open contacts $R_{10}$-4 and $R_{11}$-1 close to pick up relay $R_{18}$, causing cyclone valve 18 to open and couple the interior of the tank T1 through line 14 to the cyclone and vent (FIG. 1). Cyclone valve 18 is coupled to a limit switch SW-3 (FIG. 7) which closes when the valve 18 opens and vice versa. The switch SW-3 is coupled in series with normally open contacts $R_{10}$-4 and $R_{11}$-2 and with the coil of relay $R_{12}$. Thus when the valve 18 opens, switch SW-3 closes, thereby completing an energizing circuit to pick up relay $R_{12}$ and open fill valve 12 (FIG. 1). When valve 12 opens, flux begins to flow through conduit 10 into the flux tank T1.

The filling operation continues until the operator depresses the momentary-break STOP FILL push button switch PB-5 (FIG. 7) to drop out relay $R_{10}$ or when the fill limit is reached as determined by limit switch SW-4 (FIG. 3) on weight recorder 58b. This causes contacts $R_{10}$-3 and $R_{10}$-4 (FIG. 6) to open, thereby dropping out relays $R_{18}$ and $R_{12}$ and closing valves 18 and 12. At the same time, contacts $R_{10}$-2 (FIG. 6) will close to allow the operator to begin the injection operation. Alternatively, the filling operation may be temporarily halted automatically when the increasing amount of flux in the tank T1 causes the internal pressure to rise above the aforementioned predetermined minimum. This causes pressure switch PS-15 (FIG. 7) to open, thus dropping out relay $R_{11}$ and opening contacts $R_{11}$-1 and $R_{11}$-2. This also results in relays $R_{18}$ and $R_{12}$ (FIG. 7) dropping out and closing cyclone valve 18 and fill valve 12. Relay $R_{10}$, (FIG. 7) however, remains energized until STOP FILL button PB-5 is depressed.

Vent valve 26 (FIG. 1) is opened upon relay $R_{26}$ (FIG. 7) being energized to vent the interior of the flux tank T1, thereby lowering its internal pressure. The coil of relay $R_{26}$ (FIG. 7) is coupled to the voltage source through a series combination of normally open contacts $R_{10}$-5 and normally closed contacts $R_{11}$-3. Thus as long as the internal tank pressure is above that switch will allow the pressure switch PS-15 to close, relay $R_{11}$ will remain de-energized and contacts $R_{11}$-3 will remain closed to pick up relay $R_{26}$ and open the vent valve 26. This will permit the tank T1 (FIG. 1) to vent to the atmosphere and reduce the internal pressure. When the pressure becomes sufficiently low, switch PS-15 (FIG. 7) will close, thus picking up relay $R_{11}$ and opening contacts $R_{11}$-3. This causes relay $R_{26}$ to drop out and relays $R_{18}$ and $R_{12}$ to pick up, closing the vent valve 26 and opening the cyclone valve 18 and fill valve 12. The venting and filling operation will continue in this manner until the operator depresses the STOP FILL button PB-5 (FIG. 7).

ALTERNATIVE EMBODIMENTS

From a consideration of FIG. 9, it will be apparent that the present invention may be employed with a bottom blown converter 210 having bottom submerged tuyeres 212, the side submerged tuyere 214, a fixed side tuyere 216, a movable side tuyere 216a directed toward the carbon monoxide zone (CO zone) of the converter 210 and mouth tuyeres 217. The movable side tuyere 216a is of the type described in U.S. patent application Ser. No. 309,018 filed Nov. 24, 1972 by W. A. Kolb et al for "Apparatus for and Method of Optimum Burning of Carbon Monoxide in a Converter" and assigned to the same assignee as the present invention. This bottom blown converter 210 has a shell 218 provided with a refractory lining 220 and a mouth 222 and is rotatable on trunnions 224. The tuyeres 212, 214, 216, 216a, 217 are adapted to carry in an inner pipe 213 either a fluid alone, such as oxygen, air, argon, or mixtures thereof, or entrained pulverized additives therein, such as a fluxing agent (burned lime (CaO) or the like), a liquefying agent (fluorospar ($CaF_2$) or the like), or a blocking or deoxidizing agent (ferro manganese or the like), and in an outer pipe 215 a shroud gas, such as propane, natural gas, light fuel oil or the like.

Figure 10:
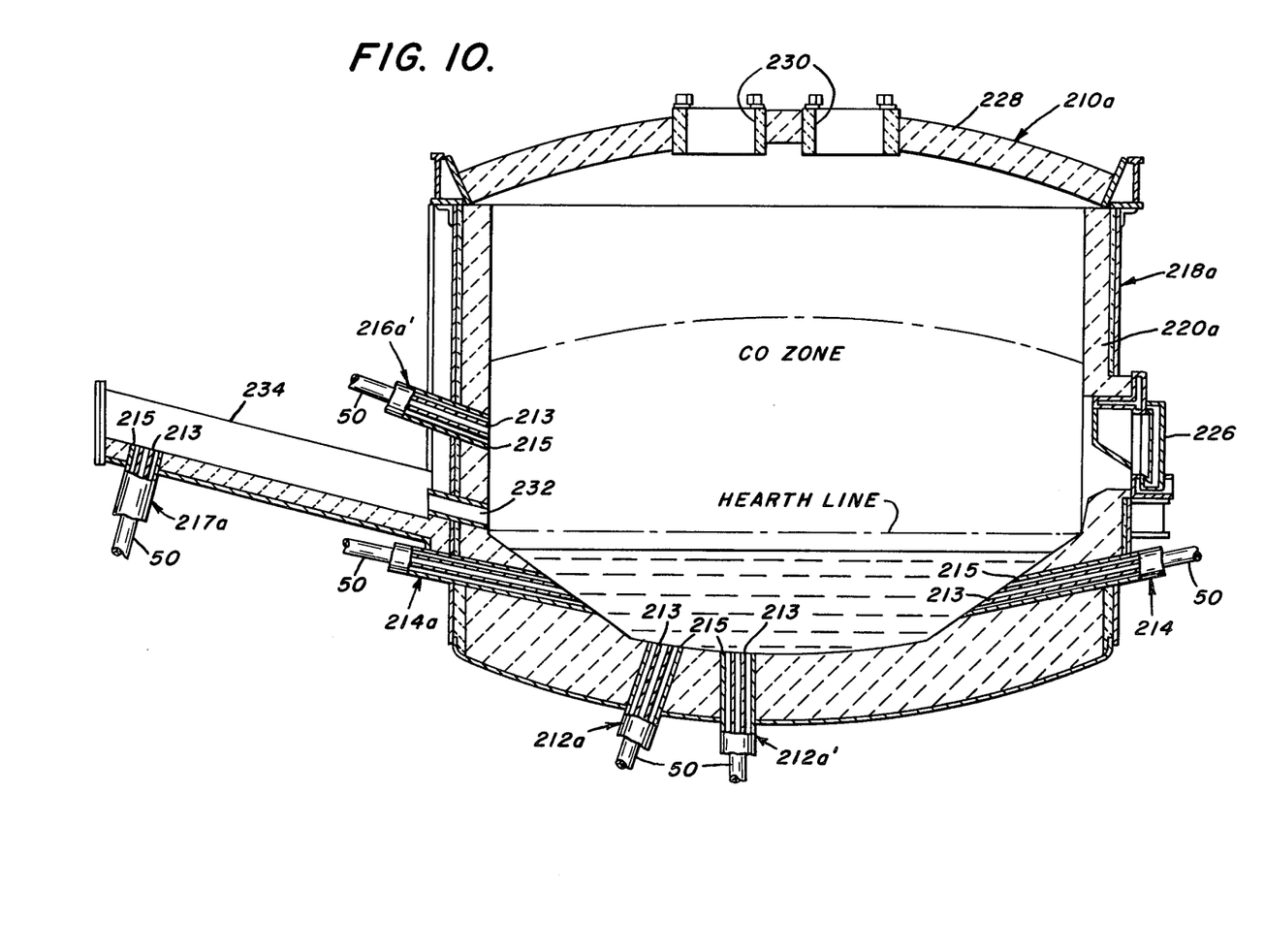
FIG. 10 is a view similar to FIG. 9 of an electric furnace showing the use of the method and apparatus of the present invention with bottom submerged tuyeres, side submerged tuyeres, a side tuyere and a spout tuyere.

As shown in FIG. 10, the present invention is also applicable to a Heroult Type electric-arc steelmaking furnace 210a provided with a vertical and inclined bottom submerged tuyere 212a and 212a', side submerged tuyeres 214a, a side tuyere 216a' directed toward the carbon monoxide zone (CO zone) of the furnace 210a and a spout tuyere 217a. This electric-arc steelmaking furnace 210a has a shell 218a provided with a refractory lining 220a, a side door 226, a refractory roof 228 provided with electrode holes 230, a tap hole 232, and a pouring spout 234 extending from the tap hole 232. The tuyeres 212 and 212a', 214a, 216a', 217a are adapted to carry in an inner pipe 213 either a fluid alone, such as oxygen, air, argon, or mixtures thereof, or entrained pulverized additives therein, such as a fluxing agent (burned lime (CaO) or the like), a liquefying agent (fluorspar ($CaF_2$) or the like), or a blocking or deoxidizing agent (ferro manganese or the like), and in an outer pipe 215, a shroud gas, such as propane, natural gas, light fuel oil or the like.

Figure 11:
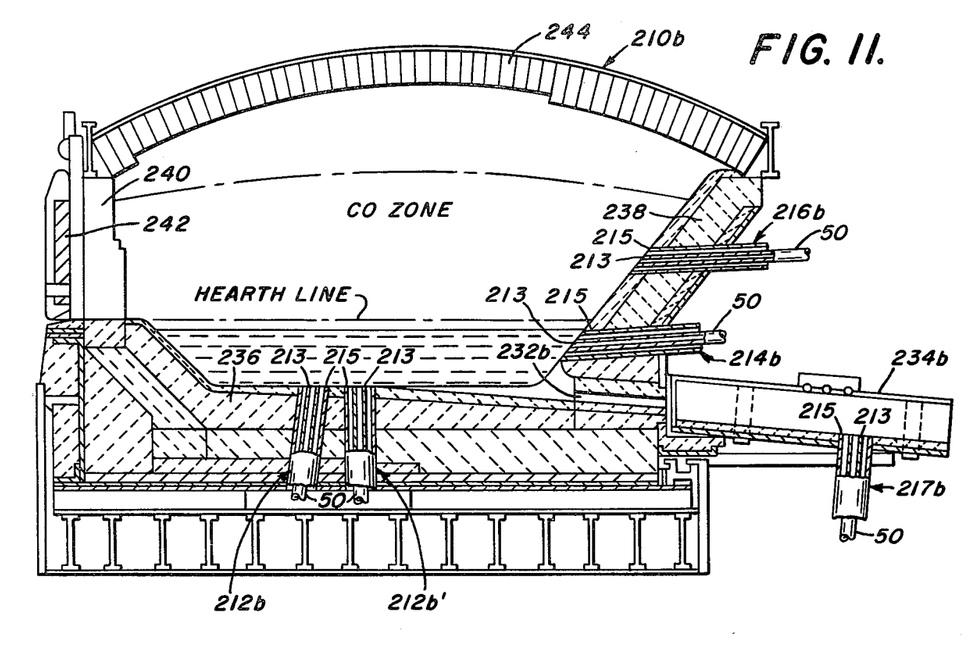
FIG. 11 is a view similar to FIGS. 9, 10 of an open hearth furnace showing the use of the method and apparatus of this invention with bottom submerged tuyeres, a side submerged tuyere, a side tuyere and a spout tuyere.

In addition, the present invention may be employed as shown in FIG. 11 with the open hearth furnace 210b having the vertical and inclined bottom submerged tuyeres 212b and 212b', the side submerged tuyere 214b, the side tuyere 216b directed toward the carbon monoxide zone (CO zone) of the furnace 210b and the mouth tuyere 217b. This open hearth furnace 210b includes a refractory lined bottom 236, a refractory lined sloping back wall 238, a refractory lined front wall 240, a charging door 242 in the wall 240, and a refractory lined roof 244. A tap hole 232b opposite the charging door 242 leads to a pouring spout 234b. The tuyeres 212b, 212b', 214b, 216b, 217b are adapted to carry in an inner pipe 213 either a fluid alone, such as oxygen, air, argon, or mixtures thereof, or entrained pulverized additives therein, such as a fluxing agent (burned lime (CaO) or the like), a liquefying agent ($CaF_2$) or the like), or a blocking or deoxidizing agent (ferro manganese or the like) and in an outer pipe 215, a shroud gas, such as propane, natural gas, light fuel oil or the like.

Figure 12:
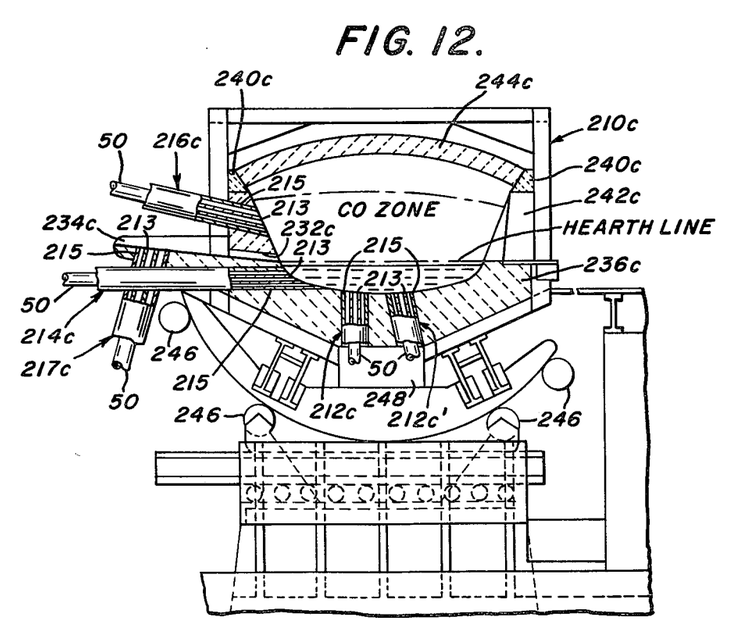
FIG. 12 is a view similar to FIGS. 9-11 of a tiltable open hearth furnace showing the use of the method and apparatus of this invention with bottom submerged tuyeres, a side submerged tuyere, a side tuyere and a spout tuyere.

Again as shown in FIG. 12, the present invention may be employed with a tilting open hearth furnace 210c mounted on rollers 246 arranged in a circular path for providing rotation on the longitudinal axis of the furnace 210c for pouring the refined steel through a tap hole 232c and a pouring spout 234c. As shown in FIG. 12, the tiltable open hearth furnace 210c has vertical and inclined bottom submerged tuyeres 212c and 212c' connected through a blast box 248 to the line 50 shown in FIG. 1. In addition, a submerged side tuyere 214c, a side tuyere 216c directed toward the carbon monoxide zone (CO zone) of the furnace 210c and a spout tuyere 217c are employed. The tiltable open hearth furnace 210c has a refractory lined bottom 236c, refractory lined back wall 238c, refractory lined front wall 240c (provided with a charging door 242c) and a refractory lined roof 244c. The tuyeres 212c, 212c', 214c, 216c, 217c are adapted to carry in an inner pipe 213 either a fluid alone, such as oxygen, air, argon, or mixtures thereof, or entrained pulverized additives therein, such as a fluxing agent (burned lime (CaO) or the like), a liquefying agent (fluorspar ($CaF_2$) or the like), or a blocking or deoxidizing agent (ferro manganese or the like), and in an outer pipe 215, a shroud gas, such as propane, natural gas, light fuel oil or the like.

Figure 13:
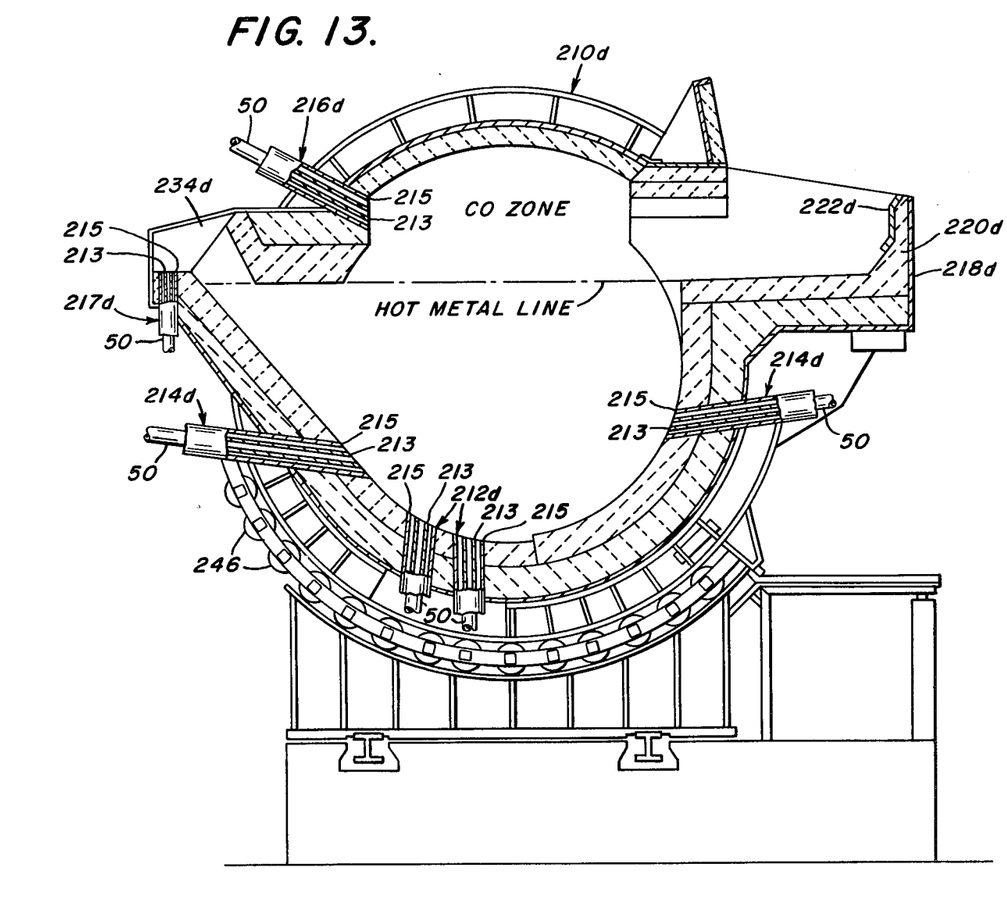
FIG. 13 is a view similar to FIGS. 9-12 of a hot metal mixer utilizing the method and apparatus of this invention with bottom submerged tuyeres, side submerged tuyeres, a side tuyere and a spout tuyere.

In FIG. 13 the present invention is employed with a hot metal mixer 210d having a shell 218d provided with a refractory lining 220d, and having also an inlet mouth 222d and a pouring spout 234d. The mixer 210d is oscillatable on rollers 246d between the charging and discharging positions. Such mixer 210d has vertical bottom submerged tuyere 212d, side submerged tuyeres 214d, side tuyere 216d directed toward the carbon monoxide zone (CO zone) of the mixer 210d and spout tuyere 217d. The tuyeres 212d, 214d, 216d, 217d are adapted to carry in an inner pipe 213 either a fluid alone, such as oxygen, air, argon, or mixtures thereof, or entrained pulverized additives therein, such as a fluxing agent (burned lime (CaO) or the like), a liquefying agent (fluorspar ($CaF_2$) or the like), or a blocking or deoxidizing agent (ferro manganese or the like), and in an outer piper 215, a shroud gas, such as propane, natural gas, light fuel oil or the like.

A discharge or mouth tuyere or tuyeres 217 (FIG. 9), 217a (FIG. 10), 217b (FIG. 11), 217c (FIG. 12) and 217d (FIG. 13) are disposed adjacent a discharge opening such as the mouth 222 (FIG. 9), the pouring spouts 234 (FIG. 10), 234b (FIG. 11), 234c (FIG. 12) and 234d (FIG. 13) to prevent the formation of skulls adjacent or on the discharge opening during the pouring operation, particularly those chromium-nickel skulls produced during the refining of stainless steel.

Method

A method for use with a steel-refining apparatus comprising a convert 210 (FIGS. 1, 9) etc., a supply of fluid 2, a primary conduit 6 coupled between the converter 210 and the fluid source 2 for supplying fluid to the converter 210 and a secondary conduit 6a having its input and output coupled to upstream and downstream portions of the primary conduit 6, 50 between the converter 210 and the supply 2, and a pressure tank T1 containing a powdered flux to be supplied to the converter 210 is disclosed. The method includes the steps of:

(a) pressurizing the tank T1;
(b) establishing a flow of the fluid through the secondary conduit 6a into conduit 50;
(c) establishing a flow of fluid through conduit 46 at the outlet of the flux tank T1 into conduit 50;
(d) terminating flow thru the secondary conduit 6a;
(e) supplying flux from the tank T1 to the conduit 46 after the tank has been pressurized in step (a) and fluid flow has been established in step (c);
(f) measuring the amount of flux supplied to conduit 50 at any given time and comparing that amount with a predetermined desired amount of material for said given time; and
(g) controlling the rate of flux injected to the conduit 50 in response to the comparison made in step (f) above.

Additionally, the method includes the further steps of:

(h) measuring the amount of flux supplied to the conduit 46 from said tank T1;
(i) comparing the measured amount with a preset reference amount; and
(j) shutting off the supply of flux from the tank T1 to the conduit 46 in step (e) when the difference between the measured and reference amounts reaches a predetermined value.

It is to be understood that while the present invention has been described and shown as an analog type system, the control functions described herein could also be performed by a digital control system, such as in a digital computer.

While in accordance with the patent statutes a preferred and alternative embodiments of this invention have been illustrated and described in detail, it is to be particularly understood that the invention is not limited thereto or thereby.

I claim:

1. A method for use with a steel-refining apparatus comprising a converter, conduit means supplying fluid at a predetermined pressure to the tuyeres of said converter, and a flux-containing pressure tank coupled to said conduit means through variable orifice valve means, said method including the steps of:

(a) pressurizing said tank until is internal pressure is substantially the same as the pressure of the fluid in said conduit means;
(b) opening said variable orifice valve means to establish a flow of flux from said tank to said conduit means;
(c) measuring the actual weight of flux which has flowed out of said tank at any given time;
(d) comparing the actual weight with a predetermined desired reference weight; and
(e) controlling the size of the orifice of said valve means to control the actual flow rate of flux therethrough as a function of the difference between said actual and reference weights.

2. The method as recited in claim 1, comprising the further steps of:

applying fluid at a second pressure greater than said tank and conduit means pressure to said variable orifice valve means to facilitate ejection of flux from said tank into said conduit means; and maintaining said two pressures at a constant differential pressure.

3. The method as recited in claim 1, comprising the further steps of:

measuring the pressure of the fluid flow in said conduit means; and by-passing the tank and routing said fluid directly to said converter if said fluid pressure falls outside a preset range.

4. The method as recited in claim 2, comprising the further steps of:

measuring the pressure of the fluid flow in said conduit means; and by-passing the tank and routing said fluid directly to said converter if said fluid pressure falls outside a preset range.

* * * * *